Aug. 7, 1956       C. W. BRACKIN       2,758,066
CONVERSION AND CATALYST STRIPPING SYSTEMS
Filed Sept. 11, 1951       2 Sheets-Sheet 1

INVENTOR.
Carey W. Brackin
BY
Everett A. Johnson
ATTORNEY

2,758,066

CONVERSION AND CATALYST STRIPPING SYSTEMS

Carey W. Brackin, Crown Point, Ind., assignor to Standard Oil Company, Chicago, Ill., a corporation of Indiana Application September 11, 1951, Serial No. 245,993

6 Claims. (Cl. 196—52)

This invention relates to a catalytic system for continuous hydrocarbon conversion processes such as cracking, fluid hydroforming, reforming and the like, and it pertains more particularly to systems employing a solid catalyst of a type which is initially highly active but which gradually becomes less active due to the deposition thereon of a carbonaceous material. In such systems the catalyst is periodically contacted with an oxygen-containing gas under combustion conditions so as to remove at least a portion of the carbonaceous material and thereby regenerate the catalyst for further use.

The solid catalysts employed in such systems are prepared in such a form and handled in such a manner as to be "fluidized" or "moving bed." When the solid catalyst is in the form of relatively large particles ranging in size of between about 0.05 and 0.5 inch, the technique using downwardly moving beds of particles has been used, whereas when the solid catalyst is in the form of finely divided solids of between about 10 and 200 microns, it is used in a fluidized catalyst system employing a dense turbulent suspended phase.

In the fluid catalytic cracking process, the conventional reactor in general use is a single large vessel containing a dense turbulent fluid bed of catalyst in which are intimately mixed particles of regenerated catalyst and of catalyst spent to varying degrees. As a net effect of the design of the conventional units, a uniform but high level of carbon-on-catalyst, relative to the regenerated catalyst-carbon level, is maintained in the reactor. This high carbon level tends to impair the product distribution otherwise obtained at lower carbon levels. The effects of increasing catalyst carbon level are to increase coke and gas yields and to decrease gasoline yield. Furthermore, over-cracking of gasoline formed upon initial contact of the feed with the catalyst results when prolonged contact is maintained as in a conventional system.

In the moving bed type of system, any unvaporized material reaching the reactor and remaining liquid therein stays on the catalyst and is burned in the regenerator thereby increasing the regeneration burning load and causing a corresponding loss of products recovered from the operation. Accordingly, condensation of any once-vaporized stock is to be avoided but, in practice, is not feasible.

A primary object of my invention, therefore, is to effect a reduction in the over-all coke yield which is limiting on feed throughput and/or upon conversion. A more specific object is to maintain the carbon-on-catalyst at a lower level than in conventional reactor systems. A further object is to provide a catalyst system which results in a superior product distribution. An additional object of my invention is to minimize the penalty of poor product distribution from a high level of carbon on catalyst. Likewise, it is an important object of my invention to minimize over-cracking of gasoline formed during the early period of contacting feed with catalyst in a conversion system.

Other objects of my invention include maintaining the carbon level during the early period of contact below the average carbon level for the total reactor system. Another object of the invention is to provide a system for contacting of charge stocks which require different catalyst conditions. These and other objects of my invention will become apparent as the description thereof proceeds.

Briefly my invention provides a plurality of reaction zones in series with intermediate stripping zones, the catalyst passing through a plurality of such alternate reaction and stripping zones before going to a regeneration zone. Several advantages result from such an arrangement. When the system is applied to the conversion of hydrocarbon oil, distribution of products from a given reaction zone is not adversely influenced by contact of the oil in that zone with the catalyst of higher carbon levels which is segregated in the succeeding reaction zones. Intermediate stripping in the alternate stripping zones removes product from the catalyst before the next increment of conversion is effected, and thereby minimizes over-cracking of the product. Stripping in the intermediate zones also reduces ultimate coke yield by removing high boiling materials from the catalyst as soon as they are deposited thereon and before they can be polymerized to coke.

The invention will be more fully understood from the following description read in conjunction with the accompanying drawings which form a part of this specification and wherein.

Figure 2:
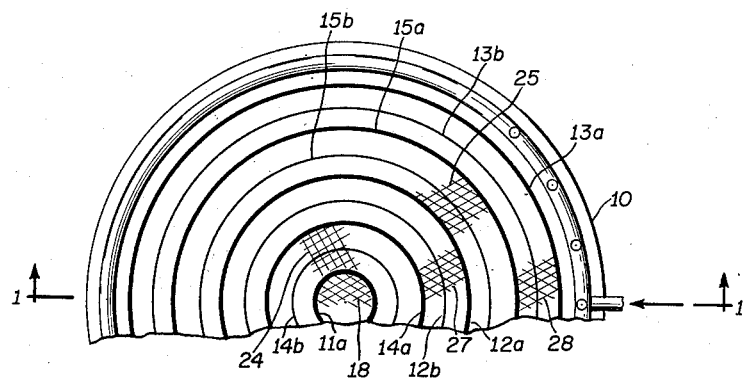
Figure 2 is a section along the line 2—2 in Figure 1.
Figure 1:
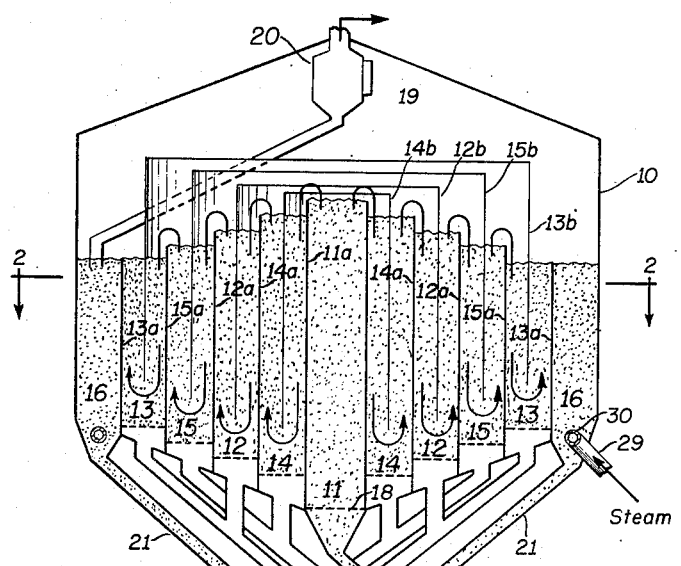
Figure 1 is a sectional view of a novel conversion reactor for use for fluidized catalyst.

Referring to Figures 1 and 2, the reactor comprises a single large cylindrical vessel 10, the lower half of which is partitioned concentrically into a number of concentric cracking and stripping zones. The reactor shown in the drawing contains three cracking zones 11, 12 and 13, each followed by a stripping zone 14, 15, and 16, respectively. Additional pairs of successive cracking and stripping zones may be provided if desired.

The partitions 14a, 12a, 15a and 13a enclosing the concentric zones 11 to 16 are successively lower than partition 11a, moving radially outward, so that the bed level in each zone is somewhat lower than the catalyst bed level maintained in the preceding zone. This arrangement prevents recirculation of catalyst between zones and prevents dilution, for example, of the low carbon level catalyst in reaction zone 11 by the catalyst in reaction zone 12 which carries a higher percentage of carbon. The concentric baffles 14b, 12b, 15b and 13b extend downwardly into the respective concentric zones 11, 14, 12, 15, and 13, and prevent bypassing of catalyst across the top of the dense catalyst bed in each respective zone.

The preferred particle size range from the fluidized catalyst is of the order of 20 to 100 microns although somewhat finer and coarser particles, e. g. 10 to 200 microns, may be employed. Catalysts in microspherical form also offer advantages.

It has been found that when employing catalyst of this particle size range an upward vapor velocity through the reaction and stripping chambers of about 1 to 2 feet per second is sufficient to maintain the catalyst in fluidized form in a dense turbulent suspension having a density of about 25 to 50 pounds per cubic foot, preferably about 40 pounds per cubic foot. Under these conditions the catalyst forms a mobile fluidized bed the level of which depends upon the height of the retaining or segregating shell. It will be seen that the pressure differential between the masses of catalyst in the successive reactors and strippers, resulting from the difference in the height of the mass, will be about 0.25 p. s. i. per foot when the average density in each of these zones is about 40 pounds per cubic foot.

Above the catalyst level there exists a so-called "dilute phase" usually containing less than 1 pound of catalyst per cubic foot. To prevent undue loss of such catalyst from the dilute phase in the reactor, it is desired to pass the effluent vapors through a cyclone separator within the upper part of the reaction vessel with a dip leg leading back to the dense catalyst phase leaving the contacting unit.

The catalyst entering one zone is forced to pass downward on the inside of the associated depending baffle and upward on the outside of such baffle before it can spill over the shell wall into the following zone. Thus the oil vapors and regenerated catalyst are blown into the initial reactor 11 in a conventional manner through line 17 and a distributor 18 located at the bottom of cylindrical reactor 11. The catalyst accumulates in a dense turbulent suspended bed within chamber 11 and spills over the enclosing partition 11a into stripping zone 14 forming a dense turbulent suspended bed therein which in turn flows over the wall 14a of stripper 14 into the second reaction zone 12. The catalyst finally spills over from reaction zone 13 into stripping zone 16 and is then withdrawn through two or more transfer lines 21 to the spent catalyst standpipe 22.

The spent catalyst is introduced into a regeneration chamber or zone (not shown) wherein the carbonaceous deposit is burned off by combustion with an oxygen-containing regeneration gas and then recycled to the reaction zone 11 with additional oil vapors for repeating of the cycle. The product vapors separate from the catalyst within the disengaging space 19 and go to the fractionating system (not shown) after passing through the cyclone 20 which removes entrained catalyst fines and returns them to the dense catalyst bed in the final stripping zone 16.

The stripping is accomplished in zones 14 and 15 by steam entering through line 23 which is dispersed through said zones by distributor grids 24 and 25 located across the bottoms of these zones. Stripping in the final stage of zone 16 is effected by steam or the like being introduced via line 29 into a distributor sparger tube 30. In the stripping operation, the catalytic gasoline and high-boiling fractions of the feed stock are removed for subsequent recovery with the product from the reactors.

To effect the desired stripping, it is desirable to maintain the temperature of the catalyst in the separate stripping zones 14, 15 and 16 at about the same temperature as that of the interposed and concentric reactors, e. g. about 850 to 1000° F. If desired, the stripping gas introduced by line 23 can be superheated to a temperature above the reaction temperature in order more effectively to remove from the catalyst the hydrocarbonaceous materials of low volatility, and to insure maintenance of the desired reaction temperature in the successive reaction zones.

The stripped catalyst from stripper 16 containing between about 0.5 and 5 percent carbonaceous deposits, usually about 1 to 3 percent, is withdrawn downwardly through lines 21 into the spent catalyst standpipe 22 and supplied to the regenerator where it is contacted with regeneration air. The temperature of the regenerator is ordinarily about 50 to 200° above the reaction temperature, e. g. about 1000 to 1100° F.

Supplemental feed can be introduced to the subsequent cracking zones 12 and 13 via line 26 and distributor grids 27 and 28. Charge stocks which require different cracking severities for realization of optimum product distribution can therefore be handled with a greater degree of flexibility in this reactor. Thus, a very refractory charge stock may be cracked in zone 11 to take advantage of the severe cracking conditions resulting from high bed level and low carbon level; whereas a less refractory stock may be charged to zones 12 and 13 by line 26 where a lower bed level and higher carbon level will result in a milder treatment and prevent over-cracking. Relative treatment of the different charge stocks can be controlled by bed level through design of the height of the shells 11a, 12a and 13a which confine the respective reaction zones. Ordinarily, shell 12a will be lower than 14a and 11a, and shell 13a lower than 11a, 14a, or 12a.

Figure 3:
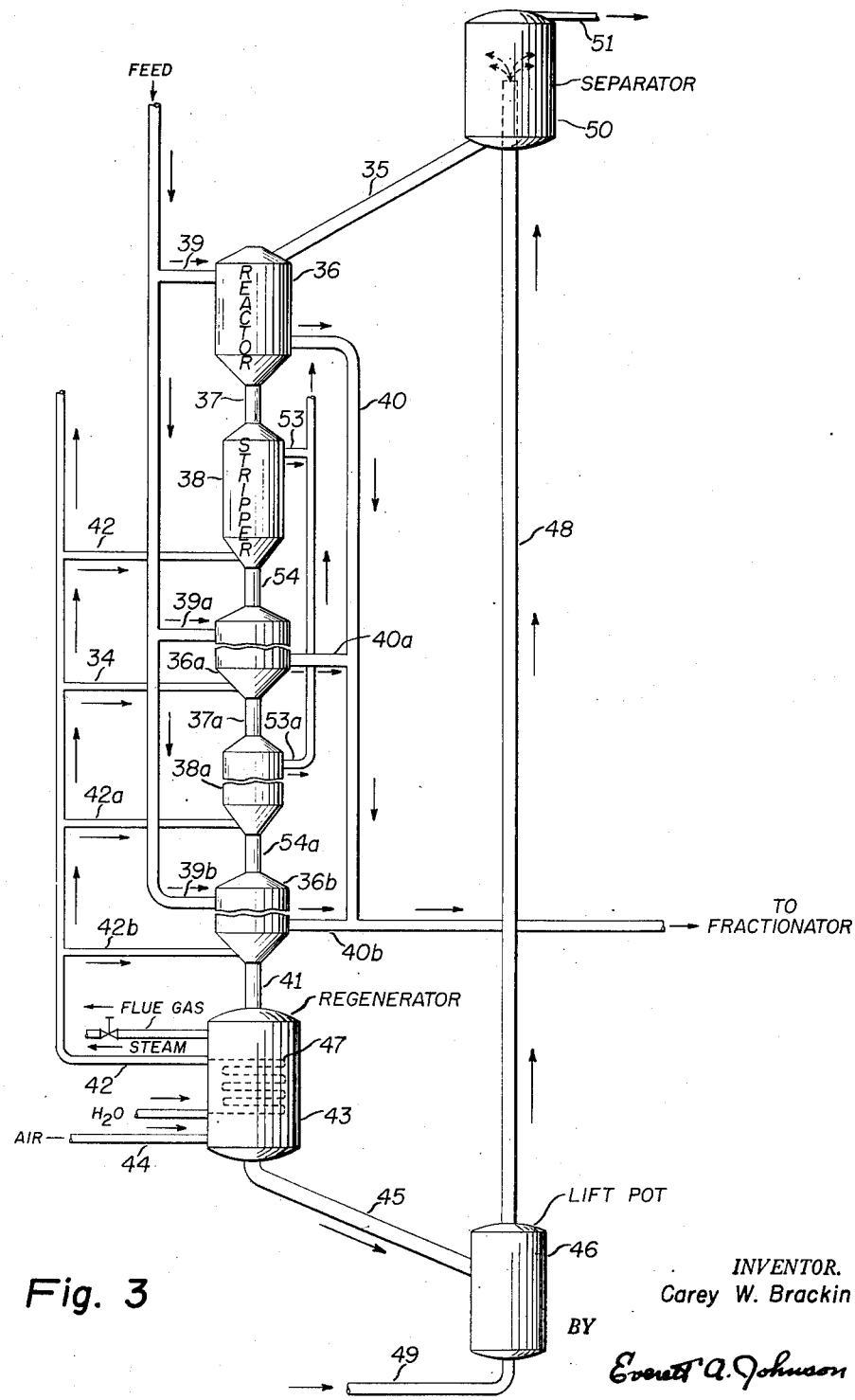
Figure 3 is a diagrammatic elevational view of one form of apparatus employing the moving bed technique.

Referring to Figure 3, a moving-bed type apparatus is shown wherein catalyst of relatively large particle size is passed downwardly in non-turbulent flow by gravity through the superposed reactors and strippers. The catalyst is of such size (0.05 to 0.5 inch) that a mass of the catalyst is capable of downward flow in compact form while stripping gas is passed countercurrently therethrough without suspending the catalyst.

Hydrocarbon fractions to be cracked, reformed or the like, ranging from naphthas to heavy residual stocks, are introduced from a feed preparation unit of some type known to the art (not shown in the drawing) and introduced into the initial reactor 36 through conduit 39. The feed is preferably in the vapor phase and is passed downwardly through the downwardly moving bed of catalyst within reactor 36 under conversion conditions.

The catalyst travels downwardly by gravity from reactor 36 via line 37 into stripper 38 from which it is transferred via line 54 into reactor 36a. The catalyst from 36a continues downwardly through standpipe 37a into stripper 38a, flows through line 54a into reactor 36b and finally by line 41 into regenerator 43.

In passing through these alternate reactors and strippers in series the carbon-forming hydrocarbon liquids and adsorbed product are purged from the catalyst before it is used in the subsequent reactors. It is also contemplated that an additional stripper can be interposed reactor 36b and regenerator 43.

The catalyst in the strippers 38 and 38a is contacted countercurrently with a stripping medium which may be steam from lines 42 and 42a. The flue gas from regenerator 40 is at an elevated temperature of between about 1000 and 1200° F. and the steam may be superheated by indirect heat exchange with it to add heat to the catalyst for sustaining the endothermic reactions in the subsequent reactors. It is also contemplated that steam can be used alone or in admixture with hot flue gas for purging the catalyst in the stripper chambers 38 and 38a. In any event the stripper effluent is withdrawn via lines 53 and 53a and sent to a hydrocarbon recovery means (not shown). Such recovery means may, however, be the product fractionator or may comprise a cooler or condenser followed by a gas-liquid separator from which a liquid hydrocarbon stream can be withdrawn and recovered.

The catalyst, containing an accumulated carbonaceous or coke deposit, is withdrawn from the final reactor stage 36b and discharged by conduit 41 into the top of a regenerator 43 so as to form a bed of catalyst therein. Oxygen-containing gas is introduced to the regenerator via line 44 and the gas so introduced passes upwardly through the regenerator 43 contacting the coked catalyst under combustion conditions. The resulting combustion removes the carbonaceous deposit from the catalyst which is withdrawn via line 45 and introduced into lift pot 46. In order to prevent any unduly high and catalyst-damaging temperature rise in the regenerator, steam coils 47 can be provided. The produced steam can be utilized in the system as a catalyst stripping medium.

The hot regenerated catalyst is withdrawn from the regenerator 43 and flows downwardly in conduit 45 to a lift chamber or pot 46 at the bottom of the gas lift 48. Lifting gas is introduced to the gas lift by conduit 49, the hot catalyst passing upwardly from the pot 46 through the transfer line 48 to a catalyst separator 50, wherein the catalyst and lift gases are disengaged, the disengaged lifting gas being removed from separator 50 via conduit 51. The hot regenerated catalyst which has been disengaged from the lifting gas settles within chamber 50 and flows to the initial reactor 36 through conduit 35 as a relatively compact non-turbulent mass.

Compositions effective as hydrocarbon conversion and/or cracking catalysts (typically natural or synthetic silica-alumina, platinum on alumina, etc.) and methods of preparing them are well known to the art. In any event since they do not form a part of the claimed invention, details have not been given.

From the above description it will be apparent that I have devised two systems wherein the catalyst is used in a series of reaction zones with intermittent stripping of unvaporized hydrocarbons from all the catalyst whereby excessive deposition is avoided and product recovery is increased. It should be understood, however, that the detailed embodiments of my invention have been described for the purpose of illustration only and that modifications and revisions can be made by those skilled in the art without departing from the scope of the invention as described herein.

What I claim is:

1. In a catalytic process wherein a finely divided solid catalyst is contacted with a hydrocarbon for conversion thereof and a carbonaceous deposit accumulates on the catalyst, the improvement which comprises separately contacting said solid catalyst with separate streams of hydrocarbon, flowing the catalyst through a multiple series of alternate hydrocarbon contacting and stripping stages prior to regeneration of the catalyst by oxidation with air whereby the carbon-on-catalyst level is maintained the lowest in the initial conversion stage and highest in the final conversion stage, maintaining each successive mass of catalyst at a substantially lower top level whereby the catalyst is caused to cascade radially outward from an upwardly flowing mass into a downwardly flowing mass in repeated series, said stripping being effected by flowing a stripping medium upwardly through a downwardly moving mass of catalyst and withdrawing the stripping medium and stripping products from an upper part of each said stripping stages, said hydrocarbon conversion being effected by vertical flow of hydrocarbon feed and vertical flow of finely divided catalyst, said vertical flows being at least in part concurrent through said contacting stages.

2. The process of contacting finely divided solids with multiple gasiform fluids which comprises maintaining a plurality of laterally segregated masses of such solids, distributing a plurality of separate streams of gasiform fluids upwardly into said segregated masses, flowing the solids upwardly in the central mass, downward and upward in adjacent concentric masses and downwardly from the peripheral mass from the system, the elevation of catalyst in each successive catalyst mass being substantially lower than the level of the preceding mass whereby the catalyst cascades radially outward into a final annular stripping stage, and commingling the gasiform fluids which are separately introduced and withdrawing the total gasiform fluids and products from above the concentric masses of fluent solids.

3. The process of claim 1 wherein portions of the feed stock are supplied to each of said conversion stages.

4. The process of claim 1 wherein feed stocks of different conversion characteristics are fed independently to the separate conversion stages.

5. An apparatus for contacting finely divided solids with gasiform fluids which comprises an upright cylindrical shell, a plurality of open-topped concentric contacting chambers defined by a plurality of concentric walls within said shell, a plurality of concentric cylindrical baffles, one of such baffles extending into each of said concentric contacting chambers from a point above the upper edges of the walls of said chambers and terminating above the bottom thereof, the lower edge of each baffle terminating at a level higher than the next inwardly disposed baffle, a gasiform fluid distributor means for introducing separate streams of gasiform fluids into said concentric chambers, the outer wall defining each of said concentric chambers being of lesser height than the next radially inward wall, means for withdrawing catalyst downwardly from the outermost concentric chamber, means disposed above the upper edges of said concentric walls and said concentric baffles for separating solids from gasiform fluids, means for transferring the separated solids into the outermost concentric contacting chambers, and means for withdrawing substantially catalyst-free gasiform fluid products from said shell.

6. An apparatus for contacting finely divided solids with gasiform fluids which comprises an upright cylindrical shell, a centrally located cylindrical chamber within said shell, a plurality of concentric chambers within said shell about said central chamber, each of said chambers being divided by an inner and by an outer concentric wall, the upper edge of the outer wall defining each of said concentric chambers being of lesser height than the associated inner wall, a plurality of cylindrical baffles, one of such baffles extending downwardly into each of said concentric chambers from a point substantially above the upper edges of said concentric walls to a point above the bottom of said chambers, the lower edge of each baffle terminating at a level higher than the next inwardly disposed baffle, means for introducing catalyst and gasiform fluids through the central cylindrical chamber, gasiform fluid distributor means across the bottom of all but the outermost of said concentric chambers, conduit means for introducing separate streams of gasiform fluids into alternate concentric chambers, means for withdrawing catalyst downwardly from the outermost of said concentric chambers, means disposed above the upper edges of said concentric walls and said concentric baffles for separating solids from gasiform fluids, means for transferring the separated solids into the outermost concentric contacting chambers, and means above said central and concentric chambers for withdrawing substantially catalyst-free gasiform fluid products from said shell.

References Cited in the file of this patent

UNITED STATES PATENTS

| | | |
|---|---|---|
| 2,344,449 | Ogorzaly | Mar. 14, 1944 |
| 2,363,874 | Krebs | Nov. 28, 1944 |
| 2,391,336 | Ogorzaly | Dec. 18, 1945 |
| 2,425,555 | Nelson | Aug. 12, 1947 |
| 2,444,289 | Gorin et al. | June 29, 1948 |
| 2,458,109 | Simpson | Jan. 4, 1949 |
| 2,461,958 | Bonnell | Feb. 15, 1949 |
| 2,468,508 | Munday | Apr. 26, 1949 |
| 2,502,953 | Jahnig | Apr. 4, 1950 |
| 2,514,288 | Nicholson | July 4, 1950 |
| 2,521,195 | Wheeler | Sept. 5, 1950 |
| 2,525,925 | Marshall | Oct. 17, 1950 |
| 2,617,708 | Peery | Nov. 17, 1952 |